(12) United States Patent
Son et al.

(10) Patent No.: US 9,342,282 B2
(45) Date of Patent: May 17, 2016

(54) METHOD AND APPARATUS FOR DYNAMIC DATA CONFIGURATION

(71) Applicant: Samsung Electronics Co., Ltd., Suwon-si, Gyeonggi-do (KR)

(72) Inventors: Sung Jin Son, Yongin-si (KR); Sang Oak Woo, Anyang-si (KR); Seok Yoon Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 13/962,364

(22) Filed: Aug. 8, 2013

(65) Prior Publication Data

US 2014/0052967 A1 Feb. 20, 2014

(30) Foreign Application Priority Data

Aug. 16, 2012 (KR) .................. 10-2012-0089561

(51) Int. Cl.
*G06F 9/45* (2006.01)
*G06F 9/445* (2006.01)

(52) U.S. Cl.
CPC .............. *G06F 8/443* (2013.01); *G06F 9/445* (2013.01); *G06F 9/44536* (2013.01); *G06F 9/44557* (2013.01); *G06F 8/441* (2013.01)

(58) Field of Classification Search
None
See application file for complete search history.

(56) References Cited

U.S. PATENT DOCUMENTS

| 6,862,729 | B1 * | 3/2005 | Kuch et al. ................... 717/158 |
| 7,143,404 | B2 * | 11/2006 | Haghighat et al. ............ 717/159 |
| 8,122,442 | B2 * | 2/2012 | Lin ............................... 717/159 |
| 8,145,625 | B2 * | 3/2012 | McCool et al. ............... 707/715 |
| 8,910,135 | B2 * | 12/2014 | Lai ............................... 717/159 |
| 2009/0018993 | A1 * | 1/2009 | McCool et al. ................... 707/2 |
| 2009/0199169 | A1 * | 8/2009 | Lin ............................... 717/159 |
| 2010/0205580 | A1 | 8/2010 | McAllister et al. |
| 2010/0241824 | A1 | 9/2010 | Carlson et al. |
| 2011/0191567 | A1 | 8/2011 | Lancaster et al. |
| 2012/0110561 | A1 | 5/2012 | Lai |
| 2013/0104113 | A1 * | 4/2013 | Gupta et al. ................... 717/169 |

FOREIGN PATENT DOCUMENTS

KR 10-2005-0030540 3/2005
KR 10-2007-0032723 3/2007

(Continued)

OTHER PUBLICATIONS

Culler, D., et al., "Parallel Programming in Split-C," Proceedings of Supercomputing '93 [online], 1993 [retrieved Nov. 17, 2014], Retrieved from Internet: <URL: http://ieeexplore.ieee.org/xpls/abs_all.jsp?arnumber=1263470&tag=1>, pp. 262-273.*

(Continued)

*Primary Examiner* — Todd Aguilera
(74) *Attorney, Agent, or Firm* — NSIP Law (57) ABSTRACT

A method and apparatus for configuring dynamic data are provided. A compilation apparatus may select a data format showing an optimum performance when a binary code is executed, from among a plurality of data formats supported by an execution apparatus used to execute a binary code, and may generate a binary code that uses the selected data format. The execution apparatus may execute a binary code provided by the compilation apparatus.

18 Claims, 10 Drawing Sheets

(56) References Cited

FOREIGN PATENT DOCUMENTS

| KR | 10-2007-0037568 | 4/2007 |
| KR | 10-2008-0087123 | 9/2008 |
| KR | 10-2009-0095606 | 9/2009 |
| KR | 10-2011-0019775 | 2/2011 |
| KR | 10-2011-0079495 | 7/2011 |
| KR | 10-2011-0090915 | 8/2011 |
| KR | 10-2012-0025612 | 3/2012 |

OTHER PUBLICATIONS

Strzodka, R., "Data Layout Optimization for Multi-Valued Containers in OpenCL", Elsevier [online], 2011 [retrieved Jun. 29, 2015], Retrieved from Internet: <URL: http://www.sciencedirect.com/science/article/pii/S0743731511002115>, pp. 1073-1082.*

Taylor, R., et al., "A Micro-benchmark Suite for AMD GPUs", 39$^{th}$ Int'l Conf. on Parallel Processing Workshops [online], 2010 [retrieved Jan. 4, 2016], Retrieved from Internet: <URL: http://ieeexplore.ieee.org/xpls/abs_all.jsp?arnumber=5599097&tag=1>, pp. 387-396.*

Extended European Search Report issued Jan. 7, 2014 in European Patent Application No. 13180661.4.

Ismail Kadayif et al., "Quasidynamic Layout Optimizations for Improving Data Locality", IEEE Transactions on Parallel and Distributed Systems, vol. 15, No. 11, Nov. 2004, pp. 996-1011.

Ulrich Kremer, "Automatic Data Layout for Distributed Memory Machines", CRPC-TR95559-S, Oct. 1995, 142 pages.

* cited by examiner

Processing using SoA scheme

```
varying vec2 oTexCoord;
varying vec3 oCol;
uniform sampler2D TexSampler;
void main()
{
    vec3 color = oCol*texture2D(TexSampler, oTexCoord).xyz;
    gl_FragColor = vec4(color, 1.0f);
}
```

FIG.10

```
{
int condition;
if(condition)
    func_A();
else
    func_B();
}
```

FIG.11

METHOD AND APPARATUS FOR DYNAMIC DATA CONFIGURATION

CROSS-REFERENCE TO RELATED APPLICATIONS

This application claims the priority benefit of Korean Patent Application No. 10-2012-0089561, filed on Aug. 16, 2012, in the Korean Intellectual Property Office, the disclosure of which is incorporated herein by reference.

BACKGROUND

1. Field

Example embodiments of the following description relate to a method and apparatus for configuring dynamic data, and more particularly, to a method and apparatus for configuring dynamic data used in a single-instruction, multiple-data (SIMD) processor.

2. Description of the Related Art

A single-instruction, multiple-data (SIMD) processor is used to enhance processing power by simultaneously processing multiple data using a single instruction.

A SIMD scheme is used to enhance performances of various processors, for example a central processing unit (CPU), a graphics processing unit (GPU), and the like. A CPU and a GPU may be examples of a SIMD processor, which have adopted a SIMD scheme. CPU, GPU, and the like are utilized in server, laptop, desktop, and mobile computing devices such as tablets and phones.

To process data in a SIMD processor, multiple data to be processed by an instruction is required to be configured. The SIMD processor may process the multiple data using a single instruction, to enhance a performance of a computer system.

Based on a characteristic of the SIMD processor, a data format suitable to process data may be supported.

SUMMARY

In an aspect of one or more embodiments, there is provided a method by which a compilation apparatus generates a binary code by compiling a source code, including selecting a data format suitable for a processor, from among a plurality of data formats, the processor being used to execute the binary code, and generating the binary code used to process data using the selected data format.

The method may further include generating information representing the selected data format.

The processor may be a single-instruction, multiple-data (SIMD) processor.

Each of the plurality of data formats may be used by the processor to parallel process data using a SIMD scheme.

The plurality of data formats may include at least one of an array of structures (AoS) format and a structure of arrays (SoA) format.

The method may further include executing the binary code, using the processor.

The executing may include loading data based on the selected data format, processing the loaded data by applying an operation indicated by an instruction to the loaded data, and storing the processed data based on the selected data format.

The method may further include generating information representing the selected data format, and executing the binary code based on the information, using the processor.

The selecting may include predicting a performance of each of the plurality of data formats, and selecting, as a data format suitable for the processor, a data format providing a best performance, from among the plurality of data formats, based on the predicted performance.

In an aspect of one or more embodiments, there is provided a method by which an execution apparatus executes a binary code, including receiving the binary code, and information representing a selected data format, and executing the binary code using a processor, wherein the data format is selected from among a plurality of data formats supported by the processor.

The executing may include loading data based on the selected data format, processing the loaded data by applying an operation indicated by an instruction to the loaded data, and storing the processed data based on the selected data format.

In an aspect of one or more embodiments, there is provided a computer system including a compilation apparatus to select a data format suitable for a processor, from among a plurality of data formats, and to generate a binary code using the selected data format, the processor being used to execute the binary code, and the binary code being used to process data, and an execution apparatus to execute the binary code, using the processor.

The compilation apparatus may generate information representing the selected data format.

The execution apparatus may execute the binary code based on the information, using the processor.

In an aspect of one or more embodiments, there is provided a compilation apparatus including a storage unit to store a source code, and a processor to read the source code from the storage unit, to select a data format suitable for an execution apparatus from among a plurality of data formats, and to generate a binary code, the execution apparatus being used to execute the binary code, and the binary code being used to process data using the selected data format.

The processor may generate information representing the selected data format.

The compilation apparatus may further include a transceiver to transmit, to the execution apparatus, the binary code and the information representing the selected data format.

A processor of the execution apparatus may be a SIMD processor.

Each of the plurality of data formats may be used by the processor of the execution apparatus to parallel process data using a SIMD scheme.

The plurality of data formats may include at least one of an AoS format and a SoA format.

In an aspect of one or more embodiments, there is provided an execution apparatus including a transceiver to receive a binary code and information representing a data format, and a processor to execute the binary code, wherein the data format is selected from among a plurality of data formats supported by the processor.

The processor may load data based on the selected data format, may process the loaded data by applying an operation indicated by an instruction to the loaded data, and may store the processed data based on the selected data format.

According to an aspect of one or more embodiments, there is provided at least one non-transitory computer readable medium storing computer readable instructions to implement methods of one or more embodiments.

BRIEF DESCRIPTION OF THE DRAWINGS

These and/or other aspects and advantages will become apparent and more readily appreciated from the following description of example embodiments, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Hereinafter, description of a pixel may be applied to a vertex. Additionally, description of a vertex may be applied to a pixel.

Figure 1:
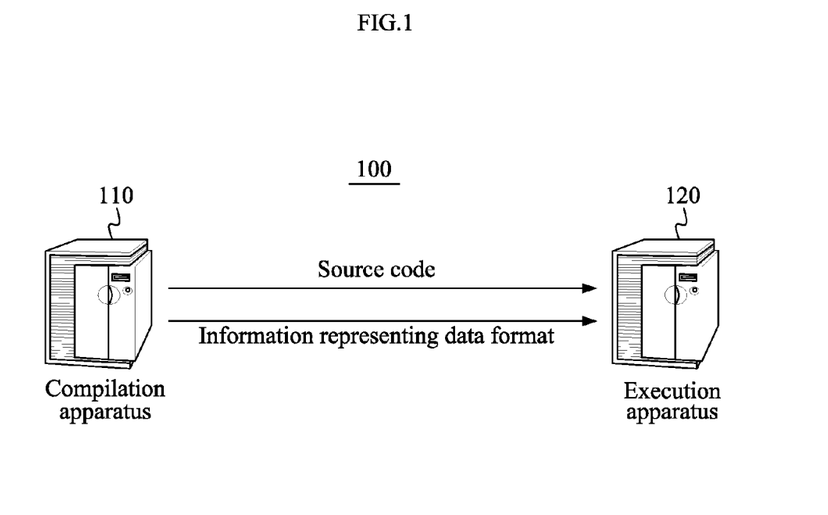
FIG. 1 illustrates a diagram of a configuration of a computer system according to example embodiments.

FIG. 1 illustrates a diagram of a configuration of a computer system 100 according to example embodiments.

The computer system 100 of FIG. 1 may analyze, in advance, a characteristic of an algorithm in a source code during compiling of the source code. The computer system 100 may select an efficient data format for parallel processing, based on a result of this analysis. Processing power of the computer system 100 may be maximized by a parallel processing scheme (parallel processing configuration) using the selected data format. In this instance, the parallel processing scheme may include, for example, parallel processing of a single-instruction, multiple-data (SIMD) scheme (single-instruction, multiple-data (SIMD) configuration). Examples of a characteristic of an algorithm may include an instruction for which SIMD processing can be applied, a condition of the execution of the instruction, and an instruction or a block of instructions of which executions depends on a conditional status. Accordingly, a branch is a characteristic of an algorithm.

As shown in FIG. 1, the computer system 100 may include a compilation apparatus 110 and an execution apparatus 120.

The compilation apparatus 110 may generate a binary code by compiling a source code. For example, the compilation apparatus 110 may be a computer to generate a binary code based on a source code by executing a compiler.

The compilation apparatus 110 may select, from among a plurality of data formats, a data format suitable for a processor or the execution apparatus 120 that may be used to execute a binary code. The compilation apparatus 110 may generate a binary code used to process data using the selected data format, by compiling a source code, and may generate information representing the selected data format. In this instance, a processor of the execution apparatus 120 may be used to execute the binary code. The processor of the execution apparatus 120 may include, for example, a central processing unit (CPU) or a graphics processing unit (GPU), which may employ an SIMD scheme (configuration).

The compilation apparatus 110 may provide the execution apparatus 120 with the generated binary code and the generated information.

The execution apparatus 120 may execute the binary code. The execution apparatus 120 may be, for example, a computer to execute a binary code. The execution apparatus 120 may execute the binary code, based on the information representing the selected data format, using the processor of the execution apparatus 120.

The compilation apparatus 110 and the execution apparatus 120 may be physically configured as a single apparatus.

Figure 2:
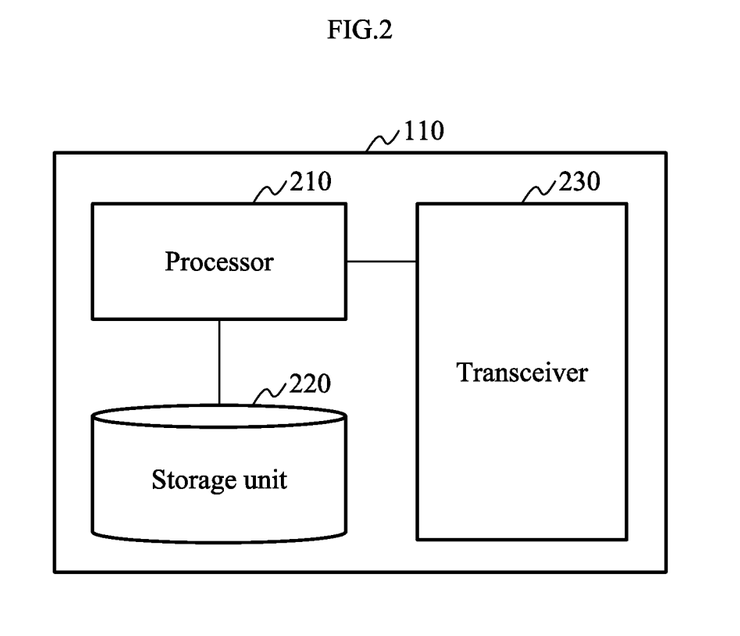
FIG. 2 illustrates a block diagram of a compilation apparatus of the computer system of FIG. 1.

FIG. 2 illustrates a block diagram of the compilation apparatus 110 of FIG. 1.

In FIG. 2, the compilation apparatus 110 may include a processor 210, a storage unit 220, and a transceiver 230.

The storage unit 220 may store a source code and a binary code.

The processor 210 may generate a binary code and information representing a data format, by compiling a source code. The processor 210 may read the source code from the storage unit 220. The processor 210 may store the generated binary code and the generated information in the storage unit 220.

The processor 210 may determine a most efficient data format corresponding to a source code input to the processor 210. The processor 210 may select, from among a plurality of data formats, a data format suitable for a processor or the execution apparatus 120 that may be used to execute the binary code. The processor 210 may generate a binary code used to process data using the selected data format, by compiling a source code, and may generate information representing the selected data format. In this instance, a processor of the execution apparatus 120 may be used to execute the binary code.

The transceiver 230 may transmit, to the execution apparatus 120, the binary code and the information representing the data format.

Figure 3:
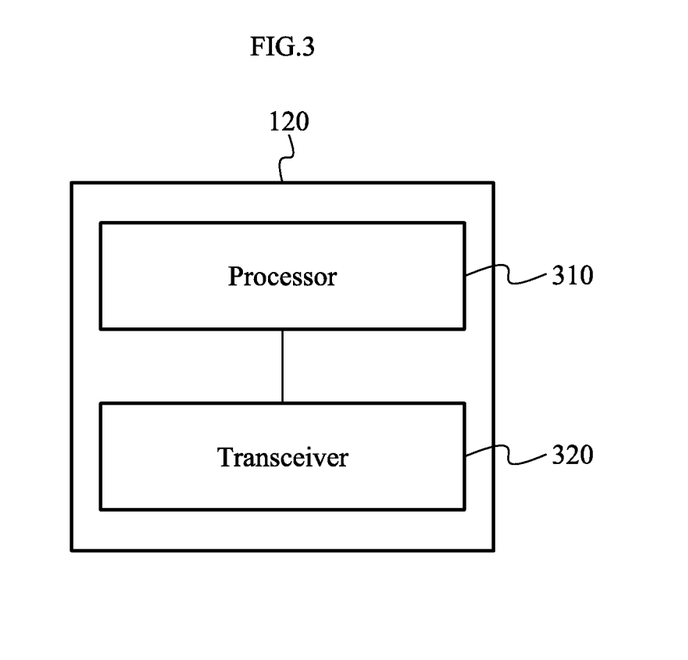
FIG. 3 illustrates a block diagram of an execution apparatus of the computer system of FIG. 1.

FIG. 3 illustrates a block diagram of the execution apparatus 120 of FIG. 1.

In FIG. 3, the execution apparatus 120 may include a processor 310 and a transceiver 320.

The transceiver 320 may receive, from the compilation apparatus 110, a code and information representing a data format.

The processor 310 may include, for example, a CPU or a GPU, which may employ a SIMD scheme (configuration). The processor 310 may execute a binary code based on the information representing the data format. CPU, GPU, and the like are utilized in server, laptop, desktop, and mobile computing devices such as tablets and phones.

Each of the plurality of data formats may correspond to a way of combining data that is required to be processed by the processor 310. Each of the plurality of data formats may be used by the processor 310 to parallel process data using a SIMD scheme (configuration).

The plurality of data formats may include at least one of an array of structures (AoS) format and a structure of arrays (SoA) format. The AoS format may refer to a data format used in an AoS scheme (AoS configuration), and the SoA format may refer to a data format used in a SoA scheme (SoA configuration). The AoS format and the SoA format will be further described below with reference to FIGS. 4 and 5, respectively.

Additionally, the plurality of data formats used by the processor 310 may further include a scalar format. The scalar format may not employ a format for a SIMD architecture of the processor 310. The format for the SIMD architecture may include, for example, an AoS format, a SoA format, and the like.

A scalar format may be selected by the processor 310 when there is no benefit of the use of an SIMD data format including the AoS format, the SoA format, and the like, or when the additional cost (additional resources) including calculated time or calculated power of the use of a SIMD format is greater than the benefit of the use of the SIMD format. A scalar format may be used because all data or program instructions may not be suitable or beneficial for processing using SIMD instructions.

Each of the plurality of data formats may be supported by the processor 310. The processor 310 may be designed to simultaneously or selectively process the AoS format, the SoA format, and the like. Also, the processor 310 may be designed to selectively process the scalar format when there is no benefit to use an SIMD format including the AoS format, the SoA format, and the like, or when the additional cost (additional resources) including calculated time or calculated power of the use of a SIMD format is greater than the benefit of the use of the SIMD format.

Information representing a selected data format may include one or more bits. For example, when the information representing the selected data format has a binary value of "00," the scalar format may be determined to be selected. When the information representing the selected data format has a binary value of "01," the AoS format may be determined to be selected. Additionally, when the information representing the selected data format has a binary value of "10," the SoA format may be determined to be selected. Further, when the information representing the selected data format has a binary value of "11," another SIMD format may be determined to be selected.

Figure 4:
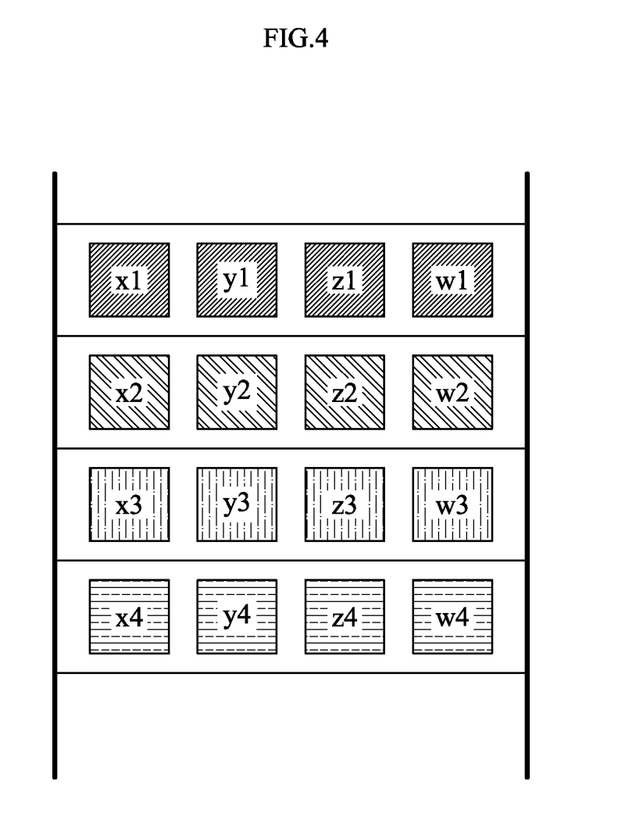
FIG. 4 illustrates a diagram of an array of structures (AoS) format according to example embodiments.

FIG. 4 illustrates a diagram of an AoS format according to example embodiments.

An AoS scheme (AoS configuration) may be used in a three-dimensional (3D) graphics field.

In the AoS scheme, a color or position of a graphic object may be combined in a single structure, and the structure may be simultaneously processed. In this instance, the graphic object may be, for example, a pixel or vertex. Components of the position may be, for example, an x-coordinate value, a y-coordinate value, a z-coordinate value, and a w-coordinate value. Components of the color may be, for example, red (R), green (G), blue (B), and alpha (A).

In FIG. 4, each row may correspond to an executed instruction, and each column may represent data processed by the processor 310 of the execution apparatus 120 based on an instruction corresponding to each row. For example, when the processor 310 processes 32-bit data at once using a SIMD scheme, each of four rows may represent 8-bit data processed by the SIMD scheme.

For example, in FIG. 4, 'x1', 'y1', 'z1' and 'w1' in a first row may represent an x-coordinate value, a y-coordinate value, a z-coordinate value, and a w-coordinate value of a first pixel processed by a first instruction, respectively. Similarly, symbols of a second row, a third row, and a fourth row may represent coordinate values of a second pixel, a third pixel, and a fourth pixel processed by a second instruction, a third instruction, and a fourth instruction, respectively.

When the AoS scheme is used, the processor 310 may simultaneously process operations for each of x, y, z, and w of a single pixel, and may sequentially process operations for each of a plurality of pixels. The AoS scheme has an advantage of applying only one instruction to all (or many) elements (e.g. x, y, z, and w) of a pixel. When the AoS scheme is used, the number of pixels associated with one SIMD instruction is less than the number of pixels associated with an instruction when the SoA scheme is used.

The AoS scheme may have an advantage of naturally processing data in 3D graphics. In the 3D graphics, the AoS scheme may be used to naturally express a color and four dimensional (4D) position of a pixel. However, the AoS scheme may have a disadvantage of a low efficiency when all components are not used in an operation of 3D graphics. For example, when a single instruction is not simultaneously applied to four components of a pixel in the AoS scheme, an efficiency of the execution apparatus 120 may be reduced. More specifically, in some applications, the w-coordinate value in the AoS scheme may not be used, but a slot for the w-value must be assigned because the SIMD scheme for executing code in the AoS format is a SIMD configuration to process x-value, y-value, z-value, and w-value at once. Therefore, the w-value may be a dummy value in some applications, so that all components are not used in an operation of 3D graphics.

Figure 5:
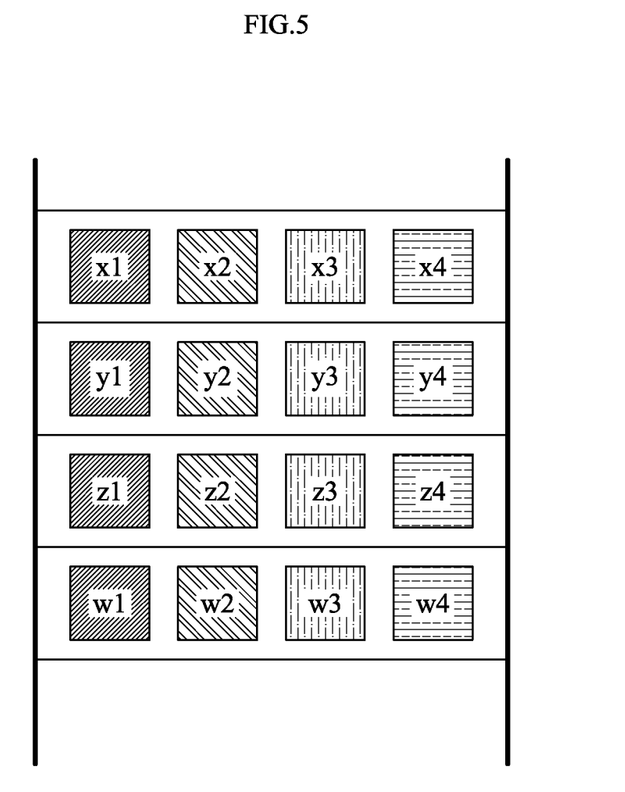
FIG. 5 illustrates a diagram of a structure of arrays (SoA) format according to example embodiments.

FIG. 5 illustrates a diagram of a SoA format according to example embodiments.

A SoA scheme (SoA configuration) may be used in a 3D graphics field.

In the SoA scheme, components of each of pixels or vertices that are required to be processed by the processor 310 of the execution apparatus 120 may be combined in a single structure, and the structure may be simultaneously processed. The components may be, for example, components of a position, or components of a color. A position of a pixel may include a component, for example, x, y, z, or w. A color of a pixel may include a component, for example, R, G, B, or A.

In FIG. 5, each row may correspond to an executed instruction, and each column may represent data processed by the processor 310 based on an instruction corresponding to each row. For example, when the processor 310 processes 32-bit data at once using a SIMD scheme, each of four rows may represent 8-bit data processed by the SIMD scheme.

For example, in FIG. 5, 'x1', 'x2', 'x3' and 'x4' in a first row may each represent an x-coordinate value of each of a first pixel through a fourth pixel that are processed by a first instruction. Additionally, 'y1', 'y2', 'y3' and 'y4' in a second row may each represent a y-coordinate value of each of a first pixel through a fourth pixel that are processed by a second instruction. In addition, 'z1', 'z2', 'z3' and 'z4' in a third row may each represent a z-coordinate value of each of a first pixel through a fourth pixel that are processed by a third instruction. Furthermore, 'w1', 'w2', 'w3' and 'w4' in a fourth row may each represent a w-coordinate value of each of a first pixel through a fourth pixel that are processed by a fourth instruction.

The SoA scheme may have an advantage of increasing an efficiency of the execution apparatus 120 to a maximum level, when the processor 310 executes identical instructions on a plurality of pixels or a plurality of vertices. For example, when the same operation is applied to a single array, the SoA scheme may be very efficient to perform the same operation using parallel instructions. In this instance, the array may be an array of pixels, and the like. For example, in applications which do not include a w-value, no slot for the w-value must be assigned. Instead, another group of x-values, group of y-value, or group of z-values, may be processed in parallel using the SoA scheme. However, when a branch occurs due to a conditional statement in an execution code in the SoA scheme, it may be difficult to control data processing, and a performance of the execution apparatus 120 may be reduced. For example, when an operation applied to a part of an array is performed based on a condition in the SoA scheme, the performance of the execution apparatus 120 may be reduced.

Figure 6:
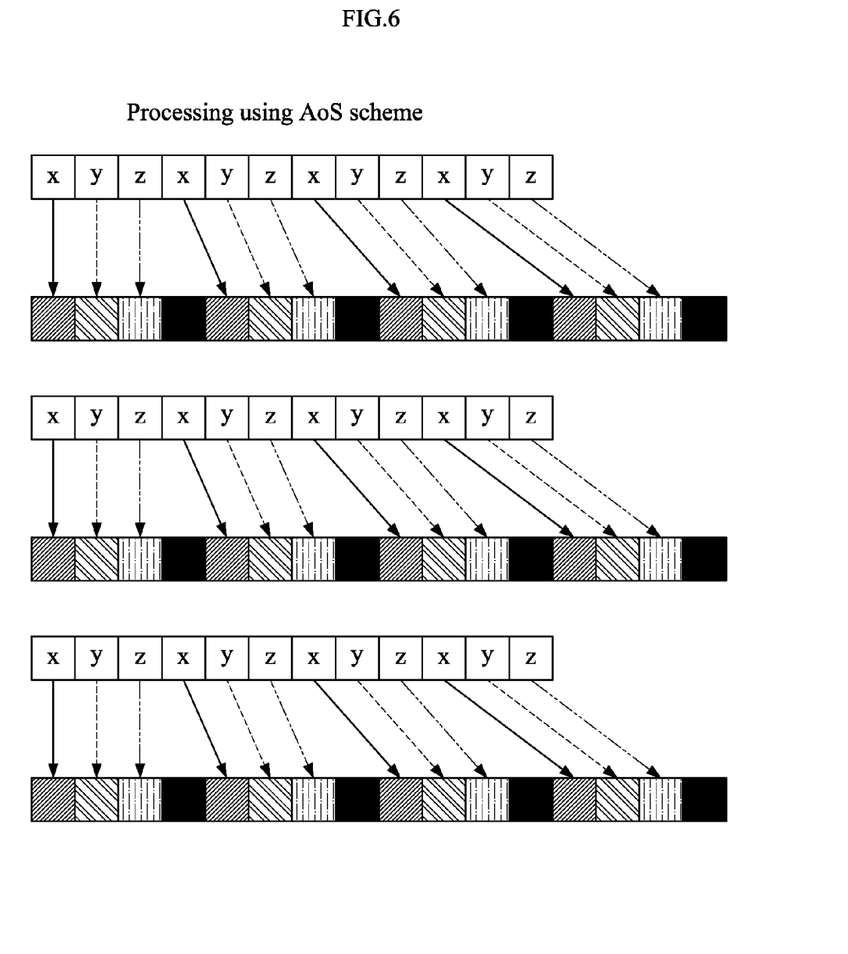
FIG. 6 illustrates a diagram of a performance of when processing using an AoS format is performed according to example embodiments.
Figure 7:
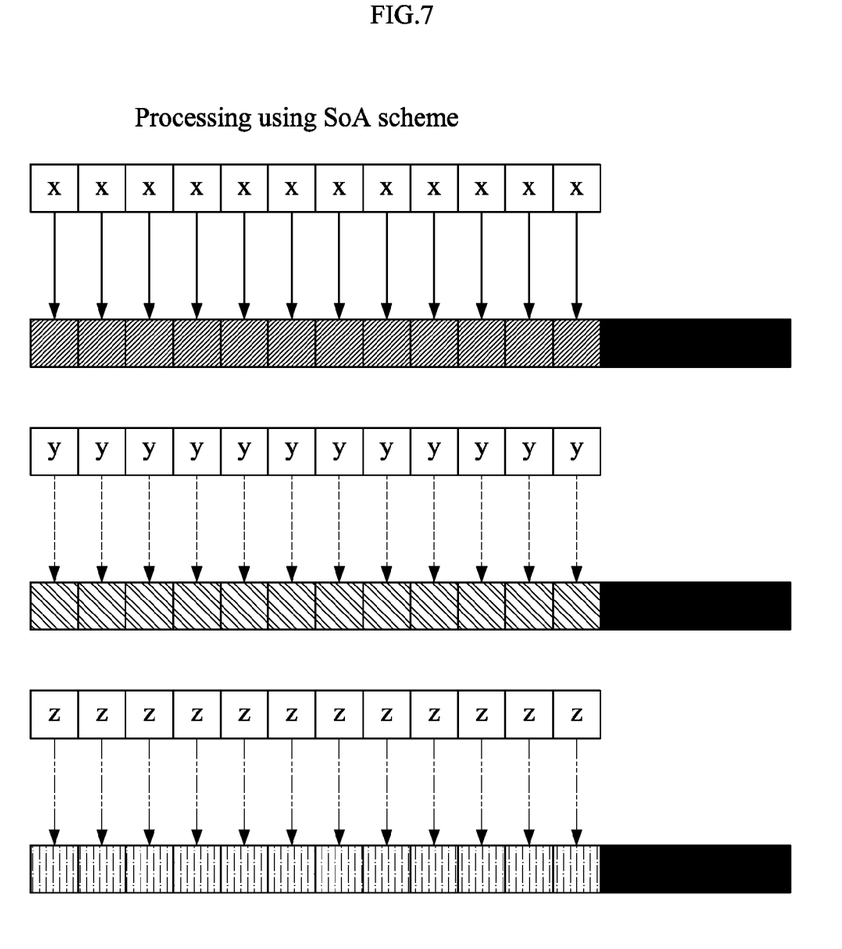
FIG. 7 illustrates a diagram of a performance of when processing using a SoA format is performed according to example embodiments.

A performance of the AoS scheme and a performance of the SoA scheme may be compared, as shown in FIGS. 6 and 7.

Referring to FIGS. 6 and 7, the processor 310 of the execution apparatus 120 may simultaneously process a maximum of 16 pieces of data using a single instruction. FIGS. 6 and 7 illustrate an operation flow of when the AoS scheme is used to process data, and an operation flow of when the SoA scheme is used to process data, respectively.

A performance of when processing is performed using the AoS scheme will be described with reference to FIG. 6.

When the AoS scheme is used, the processor 310 may simultaneously process an x-coordinate value, a y-coordinate value, a z-coordinate value, and a w-coordinate value of each of four pixels. However, when an x-coordinate value, a y-coordinate value, and a z-coordinate value of a pixel are actually processed, as shown in FIG. 6, only 12 pieces of data among 16 pieces of data processed by an instruction may be valid.

In FIG. 6, the processor 310 may perform an operation of an x-coordinate value, a y-coordinate value, and a z-coordinate value of each of 12 pixels, through three stages, where the first four pixels correspond to the first stage, the middle four pixels correspond to the second stage, and the last four pixels correspond to the third stage. In addition, in FIG. 6, three different types of lines are shown. Each type of line in FIG. 6 may represent targets of a single SIMD instruction. In the example of FIG. 6, the same operation is applied to all x-coordinates, the same operation to all y-coordinates, and the same operation is applied all z-coordinate. However, the operation applied to all x-coordinates may differ from the operation applied to all y-coordinates, which may differ from the operation applied to all z-coordinates. However, two or more operations may be the same operation.

A performance of when processing is performed using the SoA scheme will be described with reference to FIG. 7.

When the SoA scheme is used, the processor 310 may simultaneously process x-coordinate values, y-coordinate values, z-coordinate values, or w-coordinate values of a maximum of 16 pixels. However, when x-coordinate values, y-coordinate values, and z-coordinate values of 12 pixels are actually processed, as shown in FIG. 7, only 12 pieces of data among 16 pieces of data processed by an instruction may be valid.

In FIG. 7, the processor 310 may perform an operation of x-coordinate values, y-coordinate values, and z-coordinate values of 12 pixels, through three stages, where the first stage is the execution of all x pixels, the second stage is the execution of all y pixels and the third stage is the execution of all z pixels. In FIG. 7, three different types of lines are shown. Each type of line in FIG. 6 may represent targets of a single SIMD instruction. In the example of FIG. 7, the same operation is applied to all x-coordinates, the same operation to all y-coordinates, and the same operation is applied all z-coordinate. However, the operation applied to all x-coordinates may differ from the operation applied to all y-coordinates, which may differ from the operation applied to all z-coordinates. However, two or more operations may be the same operation.

Figure 8:
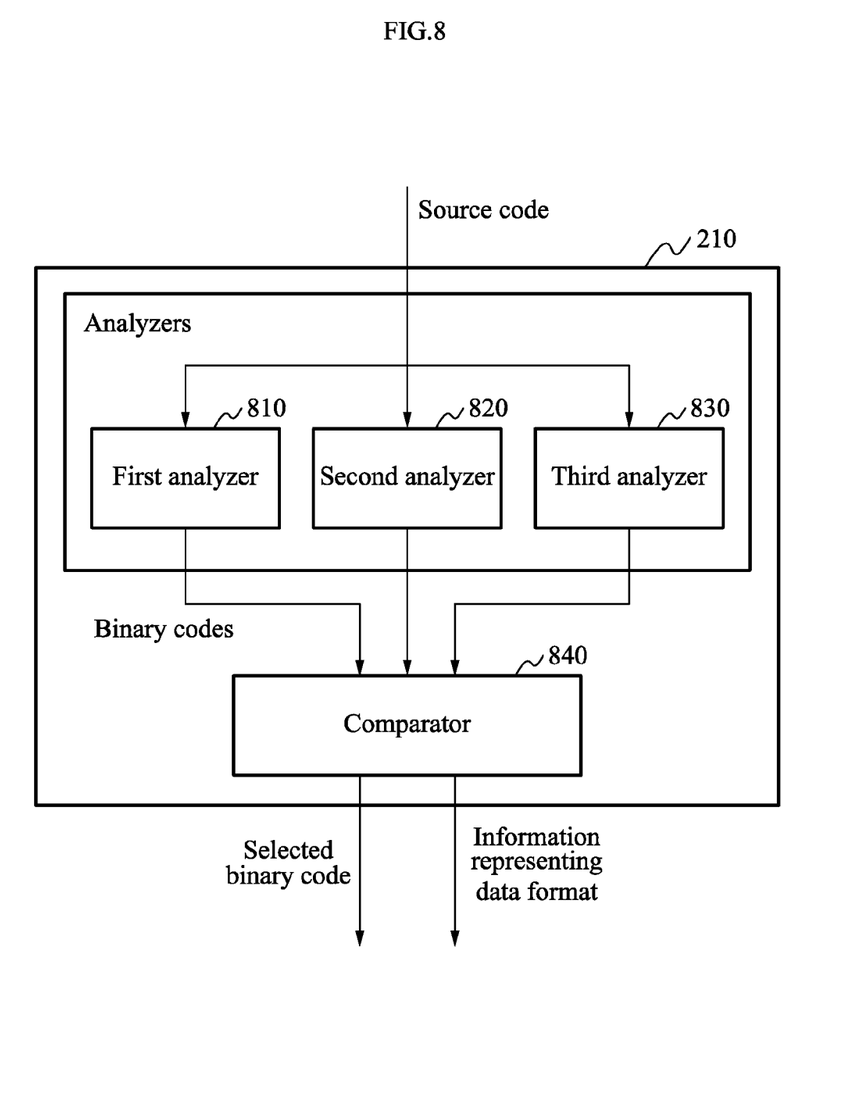
FIG. 8 illustrates a block diagram of a processor of the compilation apparatus of FIG. 2.

FIG. 8 illustrates a block diagram of the processor 210 of the compilation apparatus 110.

The processor 210 may distinguish a data format enabling the execution apparatus 120 based on a SIMD processor to efficiently use a SIMD scheme, from other data formats.

In FIG. 8, the processor 210 may include a plurality of analyzers, and a comparator 840. The plurality of analyzers may include, for example a first analyzer 810, a second analyzer 820 and a third analyzer 830. However, embodiments are not limited to three analyzers and additional analyzers may be included in processor 210.

The plurality of analyzers may dynamically predict performances of a plurality of data formats, respectively. For example, when a binary code that processes data using a data format is executed by the execution apparatus 120, a performance of the data format may be a performance of the processor 210, or a performance of the binary code.

For example, the first analyzer 810 may be a scalar analyzer. The first analyzer 810 may analyze a performance of the execution apparatus 120 by predicting processing performance (processing efficiency) for processing a binary code using a scalar scheme, which may be executed by the execution apparatus 120. The second analyzer 820 may be, for example, an AoS analyzer. The second analyzer 820 may analyze a performance of the execution apparatus 120 by predicting processing performance (processing efficiency) for processing a binary code using an AoS scheme, which may be executed by the execution apparatus 120. Additionally, the third analyzer 830 may be, for example, a SoA analyzer. The third analyzer 830 may analyze a performance of the execution apparatus 120 by predicting processing performance (processing efficiency) for processing a binary code using a SoA scheme, which may be executed by the execution apparatus 120.

The plurality of analyzers may generate binary codes for each data format, using a source code. The plurality of analyzers may analyze and predict a performance of the execution apparatus unit using the generated binary codes.

To analyze and predict the performance, an analysis scheme of a compiling operation may be applied to each of the binary codes. Specifically, each of the plurality of analyzers may apply the analysis scheme of the compiling operation to a binary code generated by each of the plurality of analyzers using one of a plurality of data formats, and may analyze or predict a performance of the generated binary code. The analysis scheme of the compiling operation may include at least one of 1) an instruction utilization, and 2) an additional cost (additional resources) incurred by a conditional branch. For example, the plurality of analyzers may predict the performance, based on an utilization of typically used instructions, and based on the additional cost incurred by the conditional branch. An additional cost may be addition calculated time or additional calculated power. Prediction of a performance will be further described with reference to FIGS. 9 and 10.

The comparator 840 may select a data format providing a best performance or optimum performance, as a data format suitable for the execution apparatus 120 or the processor 310 that may be used to execute a binary code, from among the plurality of data formats, based on the performances of the plurality of data formats analyzed or predicted by the plurality of analyzers.

The plurality of data formats may provide the comparator 840 with the binary codes. The comparator 840 may select a binary code corresponding to the selected data format among the binary codes. The comparator may output the selected binary code.

Alternatively, a user of the compilation apparatus 110, instead of the plurality of analyzers and/or the comparator 840, may select a single data format suitable for the execution apparatus 120 or the processor 310 that may be used to execute a binary code, from among the plurality of data formats. The processor 210 may generate a binary code that is used to process data using the data format selected by the user, and may generate information representing the selected data format. In this instance, the user may be, for example, a programmer of a source code.

The plurality of analyzers and the comparator 840 may each represent a function, a library, a service, a process, a thread, or a module that is performed by the processor 210.

Figure 9:
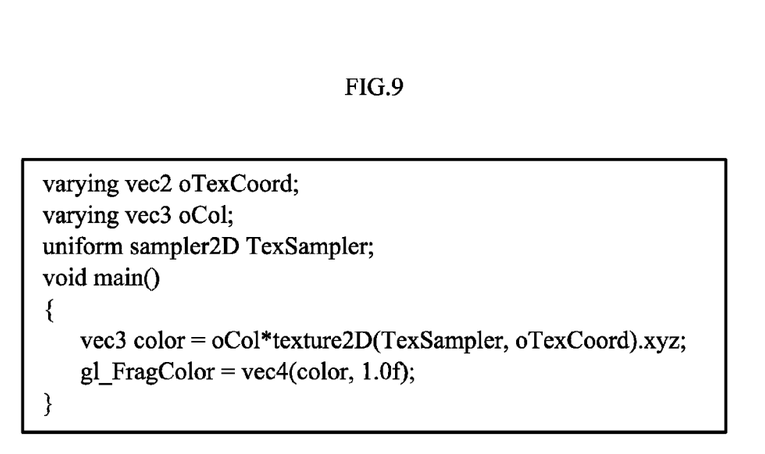
FIG. 9 illustrates a diagram of a source code used to process graphics according to example embodiments.

FIG. 9 illustrates a diagram of a source code used to process graphics according to example embodiments.

When the source code of FIG. 9 is compiled and a binary code is generated, the comparator 840 of FIG. 8 may use an instruction utilization to predict a performance.

The instruction utilization may refer to an utilization of resources used for each component.

Similar to a pixel shader that is frequently used in a GPU, only components corresponding to 3D among components representing 4D may be mainly used. When the AoS scheme is used, only 75% of available resources may be used, as shown in FIG. 6. Conversely, when the SoA scheme is used, all available resources may be used. Accordingly, the source code of FIG. 9 may be more efficiently processed, using the SoA scheme.

Figure 10:
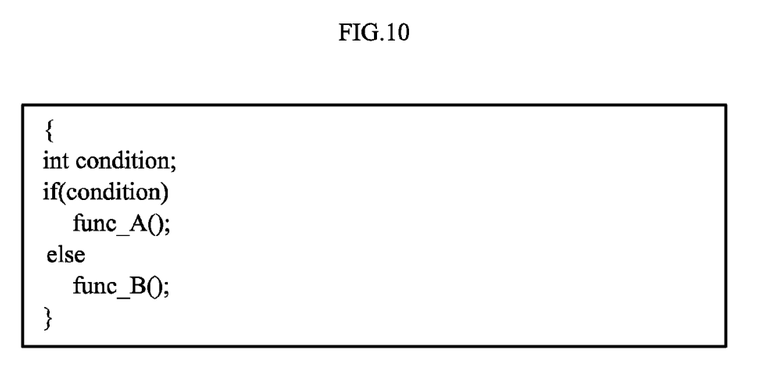
FIG. 10 illustrates a diagram of a source code including a conditional branch statement according to example embodiments.

FIG. 10 illustrates a diagram of a source code including a conditional branch statement according to example embodiments.

When the source code of FIG. 10 is compiled and a binary code is generated, the comparator 840 of FIG. 8 may use an additional cost incurred by a conditional branch in the source code to predict a performance.

The conditional branch statement may be one of most difficult problems in a scheme used for parallel processing. Whether a predetermined instruction is executed based on a given condition may be determined based on a run-time, and it may be difficult to predict, in advance, whether the predetermined instruction is to be executed.

A large number of researches have been conducted for an increase in performance through predicting whether an instruction is to be executed. The comparator 840 may use a variety of conventional research results to calculate the additional cost incurred by the conditional branch.

Hereinafter, an example calculating an additional cost for the source code of FIG. 10 including a simple conditional branch will be described.

When the AoS scheme is used, a function may be executed only once by a branch. In this instance, a function "func_A" or "func_B" may be executed.

When the SoA scheme is used, in the worst case, both the functions "func_A" and "func_B" may be executed. An analyzer corresponding to the SoA scheme may analyze resources required by each of functions. Based on a result of the analyzing, the analyzer corresponding to the SoA scheme may substitute a probability function suitable for each of an instruction utilization when all the functions are executed and an instruction utilization when only a single function is executed, and may calculate the additional cost. In this instance, the analyzer corresponding to the SoA scheme may be, for example, an analyzer to predict a performance of a binary code using the SoA format, among a plurality of analyzers.

The plurality of analyzers may each calculate an additional cost incurred by a conditional branch of a binary code using a corresponding data format. The comparator 840 may compare additional costs of the plurality of data formats, and may select a data format suitable for the processor 310 that is to execute a binary code from among the plurality of data formats.

Figure 11:
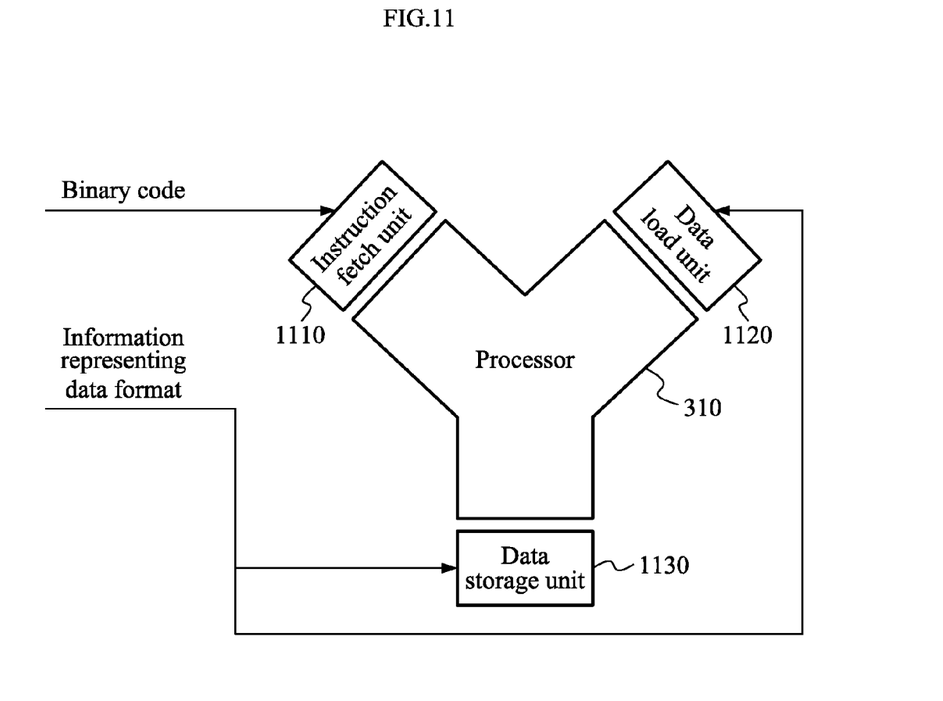
FIG. 11 illustrates a diagram of a processor of the execution apparatus of FIG. 3.

FIG. 11 illustrates a diagram of the processor 310 of FIG. 3.

The processor 310 of the execution apparatus 120 may be, for example, a processor of a dynamic SIMD architecture. In FIG. 11, the processor 310 may include an instruction fetch unit 1110, a data load unit 1120, and a data storage unit 1130. A binary code may be provided to the instruction fetch unit 1110, and information representing a selected data format may be provided to the data load unit 1120 and the data storage unit 1130.

The processor 310 may be configured by adding, to an existing SIMD processor, a function of dynamically controlling loading and storing of data based on the selected data format. The dynamic control may be performed by converting a load of an instruction level and/or a format of storage, based on a processor. Additionally, the dynamic control may be performed by converting and storing a format in a connected hardware part interface or a function interface part.

The processor 310 may process an instruction with respect to an arithmetic operation, using the same scheme, regardless of the selected data format. In this instance, the arithmetic operation may include, for example, "addition", "multiplication", and the like.

The processor 310 may provide a processing scheme matched to the selected data format, in association with a load operation and a storage operation. As shown in FIGS. 4 and 5, a relationship between the AoS format and the SoA format may correspond to transformation of a transposed matrix. In other words, a load instruction and a storage instruction may be designed to enable transposition. The processor 310 may support dynamic preparation of data required for an operation, based on the selected data format. Additionally, the processor 310 may convert an input format and a result format of data that is to be processed based on a characteristic of an algorithm to be processed. In an example, when the processor 310 is a CPU, an input and/or output to be performed in the processor 310 may not be determined. When an input and/or output is not determined, a format may be converted in a load and/or storage instruction level, an operation may be performed based on a data format. In another example, when the processor 310 is a GPU, an input and/or output to be performed in the processor 310 may be determined. When an input and/or output is determined, the processor 310 may convert a data format of input data, before a shader processes the input data, and may prepare data to be processed. Additionally, the processor 310 may process an internal arithmetic operation, by using an existing instruction without any change.

The instruction fetch unit 1110 may fetch an instruction from a binary code.

The data load unit 1120 may load data based on the selected data format. For example, loading of data may refer to placing data into an operand part of a register of the processor 310. The register may include a plurality of operand parts. The register may be, for example, an accumulator. The operand part may include bits.

When the data is loaded, the processor 310 may process the loaded data, by applying an operation indicated by the fetched instruction to the loaded data. For example, the processor 310 may apply an operation indicated by the fetched instruction to the loaded data, and may store the data to which the operation is applied, that is, updated data in the register or an accumulator. The register or the accumulator in which the updated data is stored may be identical to or different from a register or an accumulator in which data is loaded.

The data storage unit 1130 may store the processed data based on the selected data format. The storing of the processed data may indicate storing, in a memory, data in a register or an accumulator.

Figure 12:
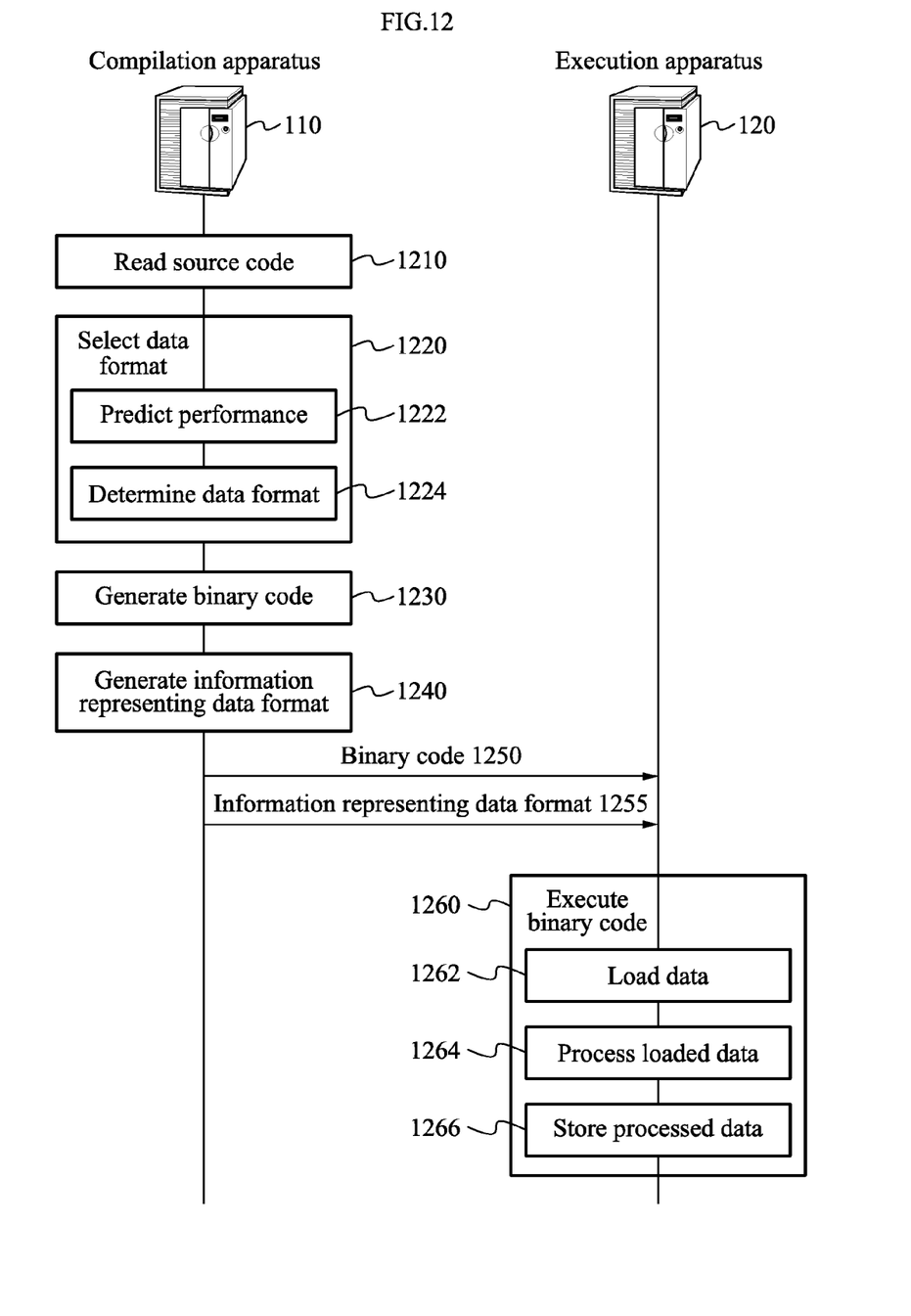
FIG. 12 illustrates a flowchart of a binary code processing method according to example embodiments.

FIG. 12 illustrates a flowchart of a binary code processing method according to example embodiments.

Referring to FIG. 12, in operation 1210, the processor 210 of the compilation apparatus 110 may read a source code from the storage unit 220 of the compilation apparatus 110.

In operation 1220, the processor 210 may select, from among a plurality of data formats, a data format suitable for the processor 310 of the execution apparatus 120 that may be used to execute a binary code. Operation 1220 may include operations 1222 and 1224.

In operation 1222, the plurality of analyzers of the processor 210 may predict performances of the plurality of data formats, respectively.

In operation 1224, the comparator 840 of the processor 210 may determine a data format providing a best performance as a data format suitable for the processor 310 that may be used to execute a binary code, from among the plurality of data formats, based on the predicted performances of the plurality of data formats.

Each of the plurality of data formats may be used by the processor 310 to parallel process data using a SIMD scheme. However, if there is no benefit to using a data format used in a SIMD scheme, then a scalar format may be used to process the data. The transceiver 320 of the execution apparatus 120 may transmit information representing a plurality of data formats that may be processed by the processor 310 to the transceiver 230 of the compilation apparatus 110, although not shown in FIG. 12.

In operation 1230, the processor 210 may generate a binary code used to process data using the selected data format.

In operation 1240, the processor 210 may generate information representing the selected data format.

In operation 1250, the transceiver 230 may transmit the binary code to the transceiver 320.

In operation 1255, the transceiver 230 may transmit the information representing the selected data format to the transceiver 320. Operations 1250 and 1255 may be performed simultaneously.

In operation 1260, the processor 310 may execute the binary code. Operation 1260 may include operations 1262, 1264 and 1266.

In operation 1262, the data load unit 1120 of the execution apparatus 120 may load data based on the selected data format.

In operation 1264, the processor 310 may process the loaded data by applying an operation indicated by an instruction to the loaded data.

In operation 1266, the data storage unit 1130 of the execution apparatus 120 may store the processed data based on the selected data format.

At least one of the above-described operations 1210 through 1266 may be performed in a different order from that shown in FIG. 12, or may be performed in parallel.

Example embodiments may be applied to an apparatus and system for performing an operation based on a SIMD processor, for example, a rendering system, such as an open graphics library (OpenGL), OpenGLIES, and the like, and a parallel computing system, such as an open computing language (OpenCL), a compute unified device architecture (CUDA), and the like.

According to example embodiments, a job associated with a data format may be automatically processed by a compilation apparatus, and thus it is possible to develop a development environment convenient to a programmer, and possible to enhance an efficiency of a processor of an execution apparatus.

Additionally, according to example embodiments, it is possible to convert an internal data format of a standard language, even when a data format of the standard language may not be converted by a programmer, such as an OpenGL, an OpenGLIES, and the like. Thus, it is possible to enhance an efficiency of a processor of an execution apparatus.

Furthermore, when the efficiency of the processor is enhanced, a processing time may be shortened, and an amount of power to be used may also be reduced.

The methods according to example embodiments may be recorded in non-transitory computer-readable media including program (computer readable) instructions to implement various operations embodied by a computing device such as a computer. The computing device may have one or more processors. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The non-transitory computer-readable media may also be a distributed network, so that the program instructions are stored and executed in a distributed fashion. The program instructions may be executed by one or more processors or processing devices. The computer-readable media may also be embodied in at least one application specific integrated circuit (ASIC) or Field Programmable Gate Array (FPGA). The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A method by which a compilation apparatus generates a binary code by compiling a source code, the method comprising:

selecting a data format based on predicted processing performance for a processor, from among a plurality of data formats comprising an array of structures (AoS) format, a structure of arrays (SoA) format, and a scalar format; and transmitting the binary code to an execution apparatus based on the selected data format, wherein the processor is used to execute the binary code and comprises a single-instruction, multiple-data (SIMD) processor, wherein the selecting comprises:
  predicting a performance of each of the plurality of data formats by generating binary codes for the each of the plurality of data formats based on the source code and analyzing the generated binary codes for the each of the plurality of data formats based on an analysis scheme of a compiling operation; and
  selecting a data format providing a best performance, from among the plurality of data formats, based on the predicted performance of each data format, whereby the scalar format is selected when no performance benefit exists to selecting array of structures (AoS) format or structure of arrays (SoA) format.

2. The method of claim 1, wherein each of the plurality of data formats is used by the processor to parallel process data using a SIMD scheme.

3. The method of claim 1, further comprising:
executing the binary code for the selected data format, using the processor.

4. The method of claim 3, wherein the executing comprises:
  loading data based on the selected data format;
  processing the loaded data by applying an operation indicated by an instruction to the loaded data; and
  storing the processed data based on the selected data format.

5. A non-transitory computer readable recording medium storing a program to control a computer to implement the method of claim 1.

6. The method of claim 1, further comprising:
  generating information representing the selected data format,
  wherein the transmitting further transmits the generated information to an execution apparatus.

7. The method of claim 1, further comprising:
  generating information representing the selected data format; and
  executing the binary code for the selected data format based on the generated information, using the processor.

8. A method by which an execution apparatus executes a binary code, the method comprising:
  receiving the binary code, and information representing a selected data format based on predicted processing performance; and
  executing the binary code using a processor;
  wherein the data format having the best predicted processing performance is selected from among a plurality of data formats comprising an array of structures (AoS) format, a structure of arrays (SoA) format, and scalar format, the plurality of data formats supported by the processor based on the predicted performance of each data format,
  wherein the processor comprises a single-instruction, multiple-data (SIMD) processor, and
  wherein the data format having the best predicted processing performance is selected by predicting a performance of each of the plurality of data formats by generating binary codes for the each of the plurality of data formats based on source code and analyzing the generated binary codes based on an analysis scheme of a compiling operation, and selecting a data format providing a best performance, from among the plurality of data formats, based on the predicted performance of each data format, whereby the scalar format is selected when no performance benefit exists to selecting array of structures (AoS) format or structure of arrays (SoA) format.

9. The method of claim 8, wherein the executing comprises:
  loading data based on the selected data format;
  processing the loaded data by applying an operation indicated by an instruction to the loaded data; and
  storing the processed data based on the selected data format.

10. A non-transitory computer readable recording medium storing a program to control a computer to implement the method of claim 8.

11. A computer system, comprising:
  a compilation apparatus, including a computer, configured to select a data format based on predicted processing performance for a processor, from among a plurality of data formats comprising an array of structures (AoS) format, and a structure of arrays (SoA) format, and scalar format, and to transmit a binary code to an execution apparatus based on the selected data format, the execution apparatus configured to execute the generated binary code by using the processor,
  wherein the processor comprises a single-instruction, multiple-data (SIMD) processor, and
  wherein the compilation apparatus is configured to predict a performance of each of the plurality of data formats by generating binary codes for the each of the plurality of data formats based on source code and analyzing the generated binary codes based on an analysis scheme of a compiling operation, and select a data format providing a best performance, from among the plurality of data formats, based on the predicted performance of each data format, whereby the scalar format is selected when no performance benefit exists to selecting array of structures (AoS) format or structure of arrays (SoA) format.

12. The computer system of claim 11, wherein:
  the compilation apparatus is configured to generate information representing the selected data format, and
  the execution apparatus is configured to execute the binary code for the selected data format based on the information, using the processor.

13. A compilation apparatus, comprising:
  a storage unit, including a non-transitory computer-readable medium, configured to store a source code; and
  a processor configured to read the source code from the storage unit, to select a data format based on predicted processing performance for an execution apparatus from among a plurality of data formats comprising an array of structures (AoS) format, a structure of arrays (SoA) format, and scalar format, and to transmit a binary code to the execution apparatus based on the selected data format, the execution apparatus being used to execute the binary code, and the binary code being used to process data using the selected data format,
  wherein a processor of the execution apparatus comprises a single-instruction, multiple-data (SIMD) processor, and
  wherein the processor configured to read the source code is configured to predict a performance of each of the plurality of data formats by generating binary codes for the each of the plurality of data formats based on the source code and analyzing the generated binary codes based on an analysis scheme of a compiling operation, and select a data format providing a best performance, from among the plurality of data formats, based on the predicted performance of each data format, whereby the scalar format is selected when no performance benefit exists to selecting array of structures (AoS) format or structure of arrays (SoA) format.

14. The compilation apparatus of claim 13, further comprising:
a transceiver configured to transmit, to the execution apparatus, the binary code for the selected data format and information representing the selected data format.

15. The compilation apparatus of claim 13, wherein each of the plurality of data formats is used by the processor of the execution apparatus to parallel process data using a SIMD scheme.

16. The compilation apparatus of claim 13, wherein the processor configured to read the source code is configured to generate information representing the selected data format.

17. An execution apparatus, comprising:
a transceiver configured to receive a binary code and information representing a selected data format, which is selected based on predicted processing performance; and
a processor configured to execute the binary code and comprising a single-instruction, multiple-data (SIMD) processor;
wherein the selected data format is selected from among a plurality of data formats supported by the processor, the plurality of data formats comprising an array of structures (AoS) format, a structure of arrays (SoA) format, and scalar format, and
wherein the selected data format is selected by predicting a performance of each of the plurality of data formats by generating binary codes for the each of the plurality of data formats based on source code and analyzing the generated binary codes based on an analysis scheme of a compiling operation, and selecting a data format providing a best performance, from among the plurality of data formats, based on the predicted performance of each data format, whereby the scalar format is selected when no performance benefit exists to selecting array of structures (AoS) format or structure of arrays (SoA) format.

18. The execution apparatus of claim 17, wherein the processor is configured to load data based on the selected data format, process the loaded data by applying an operation indicated by an instruction to the loaded data, and store the processed data based on the selected data format.

* * * * *